US006399229B1

(12) United States Patent
Takeda et al.

(10) Patent No.: US 6,399,229 B1
(45) Date of Patent: Jun. 4, 2002

(54) LIGHT-TRANSMITTING COLOR FILM, METHOD FOR PRODUCING THE SAME, AND COATING SOLUTION FOR FORMING THE COLOR FILM

(75) Inventors: Hiromitsu Takeda; Kennichi Fujita, both of Ichikawa; Taro Miyauchi, Osaka; Toshifumi Tsujino, Osaka; Tatsuya Noguchi, Osaka; Hideki Okamoto, Osaka; Takashi Muromachi, Osaka, all of (JP)

(73) Assignee: Nippon Sheet Glass Co., LTD, Osaka (JP)

( * ) Notice: Subject to any disclaimer, the term of this patent is extended or adjusted under 35 U.S.C. 154(b) by 0 days.

(21) Appl. No.: 09/333,326

(22) Filed: Jun. 15, 1999

Related U.S. Application Data

(63) Continuation-in-part of application No. 08/898,365, filed on Jul. 22, 1997, now Pat. No. 5,942,331.

(30) Foreign Application Priority Data

Jun. 18, 1998 (JP) .......................................... 10-171920

(51) Int. Cl.⁷ ................................................. B32B 9/00
(52) U.S. Cl. ....................... 428/701; 428/702; 428/428; 428/432; 428/427; 106/287.16; 106/287.17; 106/287.18
(58) Field of Search ................................. 428/428, 426, 428/432, 427, 701, 702; 106/287.16, 287.17, 287.18

(56) References Cited

U.S. PATENT DOCUMENTS 5,091,009 A * 2/1992 Nogami et al.
5,876,854 A * 3/1999 Kawazu et al.
5,942,331 A * 8/1999 Miyauchi et al.

FOREIGN PATENT DOCUMENTS

JP 09169546 6/1997

OTHER PUBLICATIONS

European Search Report, Nov. 11, 1999.
Duran, A. et al, Colored Coatings Via Sol–Gel, Riv. Stn. Sper. Vetro (Murano, Italy), 1986, 16(6), 59–64 No Month.
Zhang, Zhaoyan, "Optical Properties Of Glass Coated With Silica–Metal Oxide Thin Films," Wuhan Daxue Xuebao, 1999, 21(1), 15–18, XP002120642, (Abstract Only) no month.
Voronkova, V. M. et al, "Polymetallosilixane Coatings On Glass Surfaces," ZH. PRIKL. KHI. (S.–Peterburg), 1992, 64(4), 903–9, XP002120643 (Abstract Only) No Month.

* cited by examiner

Primary Examiner—Deborah Jones
Assistant Examiner—Wendy Boss
(74) Attorney, Agent, or Firm—Ratner & Prestia

(57) ABSTRACT

The present invention is directed to a light-transmitting color film comprising oxides which have high chemical resistance and excellent light-absorption effect, making them available in a wide color range; a method for producing the same; and a coating solution used for forming the color film. In the light-transmitting color film comprising an oxide of an element which serves as a network former and oxides of transition metal elements serving as coloring components, the element serving as a network former is at least one selected from Si, Al, and B, and the transition metal elements comprise Cu, Mn, and Ni; and the two types of oxides form a complex oxide. Moreover, a method for producing the light-transmitting color film comprises: coating on the substrate a coating solution for forming the color film which contains at least one alkoxide of elements selected from Si, Al, and B which serve as network formers, and as coloring components, transition metal salts comprising at least Cu, Mn, and Ni, and at least one organic compound having a functional group which can coordinate the transition metals; and thereafter firing the substrate.

14 Claims, No Drawings

LIGHT-TRANSMITTING COLOR FILM, METHOD FOR PRODUCING THE SAME, AND COATING SOLUTION FOR FORMING THE COLOR FILM

This application is a continuation-in-part of U.S. patent application Ser. No. 08/898,365 filed Jul. 22, 1997, now U.S. Pat. No. 5,942,331.

BACKGROUND OF THE INVENTION

1. Field of Invention

The present invention relates to a light-transmitting color film exhibiting absorption characteristics within the visible spectrum, a method for producing the film, and a coating solution for forming the color film. More particularly, the present invention relates to a light-transmitting color film having reflectance and reflecting tone which are useful for automobile glass, a method for producing the film, and a coating solution for forming the color film.

2. Description of the Related Art

A transition metal oxide is an inorganic material exhibiting characteristic absorption within the visible spectrum. The theory explaining the absorption mechanism is as follows. When oxygen is coordinated with a transition metal, the d orbital of the transition metal is split into several energy levels. Upon splitting, coloring characteristic to the visible spectrum occurs because the electron transition energy within the orbital, which is 1–3 eV, overlaps the light energy within the visible spectrum. The same theory is considered to account for the phenomenon wherein a complex oxide including two or more kinds of transition metals absorbs visible light.

Examples of industrial application of color films using the same theory include glass products designed to have a privacy-protecting function when used for window glass of vehicles and houses, in which transmittance of visible light is reduced by means of coating transparent glass with the film, as well as glass products having a function of blocking heat rays and ultraviolet rays by shielding sunlight. Since these glass products are used for the windows of houses or vehicles, they require durability, including high wear and abrasion resistance, and high chemical resistance.

Methods for producing the above-described film include a vacuum deposition method and a sputtering method. These dry methods require expensive vacuum systems. Most glass for automobile windows is bend-processed in accordance with design requirements. Therefore, in industrial manufacturing, such glass are not a proper substrate to be processed by dry methods.

In the meantime, a thermal decomposition method is advantageous in that it provides film easily at low cost without need of expensive equipment. In the method, a starting material such as a metal salt is dissolved in a solvent, and the resultant solution is applied to a substrate and heated to high temperature, to thereby obtain metal oxide film. The method permits production of color film at low cost; however, practical application of the method has been successful only in the production of films having high reflectance.

Under these circumstances, a unique coating solution for producing color film and a method for producing color film are disclosed (J. Non-Crystalline Solids, 82, (1986), p 378–p390). The coating solution is produced by addition, to a metal salt solution used in the thermal deposition method, of a metal alkoxide which is vitrifiable by a sol-gel method.

The method is used for producing film having high wear and abrasion resistance and chemical resistance, such as Si oxide film, by use of the sol-gel method. The method is also used for producing an oxide by means of oxidizing a transition metal present in the above-described oxide film as a coloring component, by use of thermal decomposition method. In this method, for example, an Si alkoxide is added to and mixed with a solution in which nitrate salts or sulfate salts of any of several types of transition metals are dissolved as coloring components in accordance with the purpose. When a substrate is coated with the mixture of the metal salt solution and alkoxide hydrolyzate and then heated, a porous gel having a molecular structure of Si—O—Si is produced. When the gel-coated substrate is further heated, ions of the above-described transition metal present in the porous film of the gel undergo crystallization due to heat, to thereby precipitate to form an oxide, which functions as a coloring component. In the process, the above-mentioned gel forms a hard silica film by being densificated through burning. As a result, there can be obtained a silica glass film colored with the above-described transition metal oxide and exhibiting high wear and abrasion resistance and high chemical resistance.

Production of glass by use of the sol-gel method will next be described. First, a metal alkoxide is hydrolyzed, and the hydrolyzate is polymerized, to thereby obtain a three-dimensional network including metal atoms and oxygen atoms. By allowing the reaction to proceed further, the polymer forms a gel, and the resultant porous gel is heated, to thereby produce glass or an oxide polycrystal.

One characteristic feature of the sol-gel method resides in that the method permits low-temperature synthesis. Particularly, in practice, the low-temperature synthesis of silica glass by use of Si alkoxide is widely used for forming a hard coating film on the surface of plastics.

Color films produced by use of the sol-gel method have already been proposed.

For example, Japanese Patent Application Laid-Open (kokai) No. 9406/1993 discloses a colored-glass-gel thin film comprising a metal alkoxide, a condensation polymer of the metal alkoxide, coloring matter, an alcoholic solvent, and a dispersing agent having compatibility therewith. The coloring matter has a particle size of 300–20,000 nm, and metal oxides which serve as inorganic pigments are described as materials therefor.

However, when the technique disclosed in the above-mentioned patent application is used, the particle size of the coloring matter should be adjusted so as to maintain the transparency of the colored-glass-gel thin film.

Japanese Patent Application Laid-Open (kokai) No. 208274/1996 discloses glass having an inorganic pigment including at least $CuO$—$Fe_2O_3$—$Mn_2O_3$ and a thin film prepared from silica sol. However, the fine-particle pigment disclosed therein (elements contained in the pigment: Cu, Mn, Co, Cr, Fe, V, Ti, and Ni) involves the following problems (1) and (2). (1) haze occurs because of scattering due to the size effect of fine particles, which is related to the refractive index of the film. (2) reduction in size of fine particles is essentially required. As a result, the absorption effect of the glass becomes low.

A method for directly forming a color film by use of a transition metal alkoxide is theoretically possible. However, although common alkoxides of Si, Ti, Al, and Zr are inexpensive and relatively easy to handle, most transition metal alkoxides are expensive and difficult to handle. Therefore, the method for producing color film directly from transition metal alkoxides cannot be used as a general method which is widely applicable.

Japanese Patent Application Laid-Open (kokai) No. 169546/1997 discloses the following technique. The specification first points out problems in the above-described techniques; "When a silicon alkoxide and other components other than a coloring component are added in sufficient amounts such that the film attains sufficient durability, the absorbance of the film decreases. Therefore, an increase in the film thickness is required so as to obtain a required decrease in transmittance."

Claim 1 of the above publication discloses a coating solution for producing oxide film comprising one or more salts of metals selected from the group consisting of Co, Cr, Mn, Fe, Ni, Cu, Zn, and lanthanoids, and an ethylene glycol oligomer.

Further, claim 3 of the publication discloses incorporation of one or more alkoxides or chelates of metals selected from the group consisting of Si, Ti, and Zr to the coating solution.

Further, Examples 14, 15, and 16 of the publication disclose a coating solution comprising Co, Mn, and SiOR, a coating solution comprising Co, Fe, and ZrOR, and a coating solution comprising Co, Ni, and TiOR, respectively.

All films obtained from these Examples are half-mirror, brown transparent films, and have a reflectance of 20%–35%. The obtained films are described to have excellently low haze, excellent adhesion, and excellent chemical resistance.

Further, Examples 21, 22, and 23 of the publication disclose a coating solution comprising Cu, Mn, and SiOR, a coating solution comprising Cu, Mn, Co, and SiOR, and a coating solution comprising Cu, Mn, Co, Cr, and SiOR, respectively.

All films obtained from these Examples transmit light and are black in color, and have a reflectance of 8%. The obtained films are described to have excellently low haze, excellent adhesion, and excellent chemical resistance.

Further, Japanese Patent Application Laid-Open (kokai) No. 169546/1997 suggests that "several types of metal salts may be incorporated so as to obtain a complex oxide after firing the salts."

In the method described in the above-mentioned "J. Non-Crystalline Solids," the amount of metal alkoxide to be added is required to be increased so as to improve wear and abrasion resistance and chemical resistance of the color film. However, when the amount of metal alkoxide to be added is increased in the absence of other measures, transparency of the thin film increases since the coloring of the thin film attributed to a metal oxide decreases drastically. Therefore, in order to obtain the target absorption of light, an increase in the film thickness is required. Further, the thin film produced thereby suffers a problem in that the original color of the coloring component is not reproduced in the film because the tone of color is yellowish.

In the technique disclosed in Japanese Patent Application Laid-Open (kokai) No. 169546/1997 referred to above, in Examples 14–16, and Examples 21, 22, and 24, alkoxide(s) of one or more metals selected from the group consisting of Si, Ti, and Zr are similarly incorporated into a coating solution for producing oxide film including a metal salt and ethylene glycol oligomer.

Nevertheless, in Examples 14–16 half-mirror, brown transparent films are obtained, and in Examples 21, 22, and 24 black transparent films are obtained.

The reason why the films differ in appearance and the detailed conditions for producing the respective films are not at all described in Japanese Patent Application Laid-Open (kokai) No. 169546/1997.

The inventors of the present invention have found that the film including oxides of Si, Cu, and Mn described in Example 21 generally has poor acid resistance. Addition of Co is known to be an effective measure for improving the acid resistance of the film including oxides of Cu and Mn. Thus, Example 22 of Japanese Patent application Laid-Open (kokai) No. 169546/1997 discloses film including oxides of Si, Cu, Mn, and Co.

However, when Co is added in an amount such that satisfactory acid resistance is obtained, the color tone of the film is limited to a range of gray to yellow.

Further, the inventors of the present invention have found that when the film including oxides of Si, Cu, and Mn described in Example 21 is dipped in a solution containing an electrolyte which has less ionization tendency, the metals in the film are ionized and eluted into the electrolyte. The film including oxides of Si, Cu, Mn, and Co has improved properties with respect to elution; however, the inventors found that the improvement is insufficient.

SUMMARY OF THE INVENTION

The present invention was made in an attempt to solve coating solution for forming the color film according to the present invention are characterized by incorporation of at least one organic compound having a functional group which can coordinate transition metals serving as coloring components. Further, each of the aforementioned one or more organic compounds is incorporated in an amount of 10% or more by mole with respect to the entirety of the above-described metal salts.

In order to solve the above-described problems, the present inventors have developed a light-transmitting color film which is coated on a substrate, which comprises an oxide of a network-forming element of glass (hereinafter may be simply referred to as a network-forming element or a network former) and oxides of transition metal elements serving as coloring components, wherein the network-forming element comprises at least one element selected from the group consisting of Si, Al, and B; the total amount by mole of the network-forming element is 20–70 mol % with respect to the entirety of the elements, other than oxygen, which constitute the color film; and the amounts by mole of the transition metal elements are as described below with respect to the entirety of the elements, other than oxygen, which constitute the color film:

Cu: 10–50 mol %,
Mn: 10–50 mol %,
Ni: 1–20 mol %, and
Co: 0–20 mol %;

and the elements Cu, Mn, Ni, and Co form a complex oxide.

According to the present invention, the light-transmitting color film is produced by coating a substrate with a coating solution and firing the substrate. The coating solution comprises at least one alkoxide of Si, Al, or B as a network-forming element; transition metal salts of at least Cu, Mn, and Ni as coloring components; and at least one organic compound having a group which can coordinate the above-described transition metals.

Further, the coating solution according to the present invention comprises at least one alkoxide of Si, Al, or B as a network-forming element; transition metal salts of at least Cu, Mn, and Ni as coloring components; and at least one organic compound having a group which can coordinate the above-described transition metals.

A unique feature of the present invention resides in incorporation, as a coloring component, of Ni, and Co if desired, into a color film formed by use of a coating solution comprising as coloring components transition metal salts of primarily Cu and Mn, and a metal alkoxide.

Incorporation of Ni as a coloring component has the following effects:

(1) improvement of acid resistance
(2) attainment of the color tones of blue—gray—bronze within the range in which excellent durability is maintained.

Further, the method for forming the color film and the coating solution for forming the color film according to the present invention are characterized by incorporation of at least one organic compound having a functional group which can coordinate transition metals serving as coloring components. Further, each of the aforementioned one or more organic compounds by is incorporated in an amount of 10% or more by mole with respect to the entirety of the above-described metal salts.

DETAILED DESCRIPTION OF PREFERRED EMBODIMENTS

The respective components forming the color film of the present invention will next be described.

Hereinafter, proportions of the elements forming the color film are represented by mol % with respect to the entirety of elements forming the film other than oxygen.

Use of Si, Al, and B is advantageous in that an oxide film containing one or more of these elements is easily produced by use of a sol-gel method. These elements serve as network formers of the color film, and presence of at least one of these elements in the color film suffices. As the total amount of the network-forming elements Si, Al, and B decreases, the reflectance of the color film increases, and the strength of the film decreases. By contrast, as the above-described total amount increases, although the strength of the film increases, the proportions of the coloring components decrease correspondingly. As a result, color film of a target transmittance cannot be produced. Further, the color film tends to add a yellowish tone.

Therefore, the range of the above-described total amount is preferably 20–70 mol %. Also, Si among the network-forming elements is preferably used.

In the present invention, at least Cu, Mn, and Ni must be incorporated as transition metal elements serving as the coloring components. Among these elements, Cu and Mn are essential components for producing a blackish color film. When the amount of Cu or Mn is less than 10 mol %, the transmittance of the color film becomes excessively high, to thereby fail to obtain a color film having a target transmittance. In contrast, when the amount of Cu or Mn is more than 50 mol %, the refractive index of the color film becomes excessively high, as does the reflectance.

Ni is required for improving chemical resistance, in particular acid resistance, of the color film. When Ni content is less than 1 mol %, the obtained colored film has a lowered resistance to a solution containing an electrolyte which has less ionization tendency. Incorporation of 4 mol % or more of Ni is preferable, in view of further improving the acid resistance of the film.

On the contrary, when the Ni content is excessively high, the film tends to exhibit excessive light transmittance and to add a yellowish tone. Therefore, the Ni content is preferably 20 mol % or less, more preferably 12 mol % or less.

Co is not an essential element. However, Co is used for adjusting the tone of the color film. When the Co content is excessively high, the total content of Cu, Mn, and Ni is correspondingly too low. Therefore, the upper limit of the Co content is 20 mol %, since the target optical characteristics are difficult to attain when the Co content is excessively high.

Organic compounds will next be described. In the present invention, the organic compound has a functional group which can coordinate the transition metals. Preferably, organic compounds having the following group:

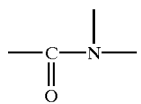

are used.

Particularly, the organic compound is at least one compound selected from the group consisting of N,N-dimethylformamide, N,N-dimethylacetamide, N,N-diethylformamide, ε-caprolactam, N-methylformamide, N-methylacetamide, formamide, acetamide, and 2-methylpyrrolidone.

The organic compound serves as a color coupler auxiliary agent by having a functional group which can coordinate the transition metals serving as coloring components. Addition of such an organic compound to a coating solution for forming a color film is considered to produce a color film in the following steps.

When a substrate is coated with a coating solution including, for example, an Si alkoxide, and the substrate is subsequently fired, the Si alkoxide in the solution first decomposes. The decomposed Si alkoxide thereby produces a porous gel having a molecular structure of Si—O—Si, and is further oxidized, to thereby initiate formation of a network structure of glass. In this step, the transition metals present as coloring components in the above-described solution are not yet oxidized, because the metals are coordinated with the above-stated organic compound. When the firing proceeds further, the transition metal ions present in the porous gel crystallize while forming a complex oxide due to heat, to thereby precipitate as fine particles in the film. The precipitate serves as a coloring component. In this step, the above-mentioned gel forms a hard silica film as a result of being hardened by firing, providing a silica glass film colored by the above-described transition metal oxides and having excellent wear and abrasion resistance and chemical resistance.

Several organic compounds among those described above serve not only as color coupler auxiliary agent but also as solvents. Organic compounds in which alkoxides or transition metal salts are highly soluble and which exhibit excellent wettability to the substrate can also be used as solvents. When, for example, N-methylpyrrolidone is used, addition of a solvent is not particularly required.

Preferably, the amount of the organic compound is 10 mol % or more with respect to the total amount in mole of transition metals serving as coloring components ([total moles of an organic compound serving as a color coupler auxiliary agent/total moles of coloring components]×100 (%)). When a solvent is further added to the coating solution, incorporation of the above-described organic compound in an amount up to about 1000% is preferable. As mentioned above, when the organic compound also serves as a solvent, the upper limit thereof is not particularly limited. However, when the amount of the organic compound is excessively high, the concentrations of the coloring components become to low. Therefore, in practice, incorporation of the organic compound in an amount up to about 3000% is preferable.

The solvent will next be described.

The type of solvent to be used is not particularly limited so long as the solvent has excellent wettability to the substrate and alkoxides or transition metal salts have excellent solubility therein.

Particularly, examples of the solvent include methanol, ethanol, propanol, isopropanol, butanol, isobutanol, cyclohexanol, methyl cellosolve, ethyl cellosolve, propyl cellosolve, butyl cellosolve, cellosolve acetate, diacetone alcohol, and 2-butanone.

Further, when N-methylpyrrolidone is used, ethylene glycol, hexylene glycol, and diethylene glycol monoethyl ether can also be used.

The method for coating the coating solution according to the present invention is not particularly limited. Any method can be used so long as the method is used for producing a smooth, thin, and uniform coating. Examples include spin-coating, flexo-coating, dip-coating, screen-printing, and gravure-coating.

EXAMPLES

The present invention will next be described in detail by way of example.

In the following Examples and Comparative Examples, spectra of transmitted light were measured by use of an auto-recording spectrophotometer equipped with an integrating sphere: UV-3100 type (Shimadzu Corporation), and the thickness of the color film was measured by use of ALPHA-STEP 500 (TENCOR INSTRUMENT).

As a glass substrate, a green glass substrate having a thickness of 3.4 mm and a size of 100 mm×100 mm was employed in all Examples and Comparative Examples, wherein the green glass substrate has the following optical characteristics: luminous transmittance of light from light source "A" (Ya)=81.0%; sunlight transmittance (Tg)=60.8%; ultraviolet ray transmittance as measured according to ISO Standard 9050, Tuv=29.6%; visible light reflectance Rg=7.2; transmitted color: light green, transparent; luminosity of transmitted light from light source "C," as expressed by chromaticity of the Lab color system, L=90.0; chromaticity of transmitted light a=−4.7, b=0.3; chromaticity of reflected light: a=−1.3, b=−0.8; and hereinafter the glass substrate is called "Green" or "G."

Table 2 shows the mole proportions of respective metals contained in each of the coating solutions in the present Examples. The "solid content" is that as measured based on the weight of oxides at the temperature at which firing was performed in the respective Examples and Comparative Examples. The solid content shown in the Table is defined as follows.

Solid content (wt. %)=(weight after firing)/(weight of a coating solution)

The weight % of each oxide was calculated based on the chemical formulas shown in Table 1, which are assumed to represent the compounds obtained from the corresponding elements through firing.

TABLE 1

| Element | Oxide formed from firing |
| --- | --- |
| Si | $SiO_2$ |
| B | $B_2O_3$ |
| Al | $Al_2O_3$ |
| Cu | $CuO$ |
| Mn | $Mn_2O_3$ |

TABLE 1-continued

| Element | Oxide formed from firing |
| --- | --- |
| Ni | $NiO$ |
| Co | $Co_3O_4$ |
| Cr | $Cr_2O_3$ |
| Ce | $CeO_2$ |

<Preparation of Source Solutions>

Source solutions used in the following Examples and Comparative Examples were prepared as follows.

To ethyl silicate (50 g) ("Ethyl Silicate 40," product of Colcoat Co., Ltd.), 1 N hydrochloric acid (30 g) and ethyl cellosolve (40 g) serving as a solvent were added and the mixture was mixed for 12 hours at room temperature. The resultant mixture was used as a silicon oxide source solution.

To trimethyl borate (103.9 g), 1 N hydrochloric acid (27 g) and ethyl cellosolve were added to thereby dilute the solution, and the resultant solution was used as a source solution.

To aluminum sec-butoxide (246.3 g), ethyl acetoacetate (130.1 g) and ethyl cellosolve (643.1 g) were added, and the resultant solution was used as a source solution.

To copper nitrate trihydrate, ethyl cellosolve was added so as to adjust the solid content to 10.0%, and the resultant solution was used as a copper source solution.

To manganese nitrate hexahydrate, ethyl cellosolve was added so as to adjust the solid content to 13.0%, and the resultant solution was used as a manganese source solution.

To nickel nitrate hexahydrate, ethyl cellosolve was added so as to adjust the solid content to 10.0%, and the resultant solution was used as a nickel source solution.

To cobalt nitrate hexahydrate, ethyl cellosolve was added so as to adjust the solid content to 10.0%, and the resultant solution was used as a cobalt source solution.

To chromium nitrate nonahydrate, ethyl cellosolve was added so as to adjust the solid content to 10.0%, and the resultant solution served as a chromium source solution.

To cerium nitrate hexahydrate, ethyl cellosolve was added, and the resultant solution was heated at 90° C. for an hour while stirring. The resultant mixture was used as a cerium nitrate source solution. A solution in which solid content of $CeO_2$ had been adjusted to 23.2% was used as a cerium source solution.

Compositions of the film in each Example are shown in Table 2. The solid content in Table 2 is expressed by the weight ratio of solid to the entirety of solution.

In the acid resistance test, film was dipped in 0.1 N—$H_2SO_4$ for 2 hours, and acid resistance was considered satisfactory when the change in visible light transmittance as measured before and after dipping was within 1%.

In the alkali resistance test, film was dipped in 0.1 N—NaOH for 2 hours, and alkali resistance was considered satisfactory when the change in visible light transmittance as measured before and after dipping was within 1%.

In the boiling water resistance test, film was dipped in 100° C. boiling water for 2 hours, and resistance was considered satisfactory when the change in visible light transmittance as measured before and after dipping was within 1%.

In the plating solution resistance test, film was dipped in a 20° C. $Cu(SO_4)_2$ solution for 400 seconds, and further dipped in a 52° C. $NiSO_4$ solution for 100 seconds, and the results were considered satisfactory when the change in visible light transmittance as measured before and after dipping was within 1%.

A Tabar's abrasion resistance test, was carried out in such a way that the film was subjected to 500 applications of friction by use of a 250 g rolling wheel, and abrasion resistance was considered satisfactory when the change in visible light transmittance as measured before and after the test was within 2% and the change in haze was within 4%.

Ya, chromaticity of the transmitted light (the Lab color system), reflectance of visible light (from light source "A") Rg and chromaticity of the reflected light (the Lab color system) as measured on the glass surface; and reflectance of

TABLE 2

| Ex. No. | Network-forming element | | | Coloring component | | | | Solid content (wt %) | Organic compound | | | Solvent |
|---|---|---|---|---|---|---|---|---|---|---|---|---|
| | Si | B | Al | Cu | Mn | Ni | Co | | Species | Quantity* | Proportion** | |
| 1 | 43.8 | 0.0 | 0.0 | 25.5 | 20.4 | 10.2 | 0.0 | 10.0 | DMF[1)] | 15 | 308 | EC[4)] |
| 2 | 46.2 | 0.0 | 0.0 | 26.9 | 21.5 | 5.4 | 0.0 | 5.0 | DMF | 15 | 321 | EtOH[5)] |
| 3 | 43.8 | 0.0 | 0.0 | 23.0 | 23.0 | 10.2 | 0.0 | 10.0 | DMF | 15 | 308 | EC |
| 4 | 45.0 | 0.0 | 0.0 | 26.2 | 23.6 | 5.2 | 0.0 | 10.0 | DMF | 15 | 327 | EC |
| 5 | 47.6 | 0.0 | 0.0 | 21.4 | 21.4 | 9.5 | 0.0 | 10.0 | DMF | 15 | 327 | EC |
| 6 | 48.5 | 0.0 | 0.0 | 21.8 | 21.8 | 7.8 | 0.0 | 10.0 | DMF | 15 | 333 | EC |
| 7 | 53.1 | 0.0 | 0.0 | 19.9 | 19.9 | 7.1 | 0.0 | 10.0 | DMF | 15 | 360 | EC |
| 8 | 43.8 | 0.0 | 0.0 | 23.5 | 22.5 | 10.2 | 0.0 | 10.5 | DMF | 10 | 205 | EC |
| 9 | 50.0 | 0.0 | 0.0 | 22.5 | 22.5 | 5.0 | 0.0 | 10.0 | DMF | 10 | 228 | EC |
| 10 | 54.5 | 0.0 | 0.0 | 20.5 | 20.5 | 4.5 | 0.0 | 10.0 | DMF | 10 | 247 | EC |
| 11 | 43.8 | 0.0 | 0.0 | 23.5 | 22.5 | 10.2 | 0.0 | 10.0 | DMF | 15 | 103 | EC |
| 12 | 43.8 | 0.0 | 0.0 | 23.5 | 22.5 | 5.1 | 5.1 | 10.0 | DMF | 10 | 227 | EC |
| 13 | 43.8 | 0.0 | 0.0 | 23.0 | 23.0 | 5.1 | 0.0 | 10.0 | DMAc[2)] | 10 | 150 | EC |
| 14 | 46.2 | 0.0 | 0.0 | 23.0 | 23.0 | 5.1 | 0.0 | 10.0 | NMP[3)] | 10 | 132 | EC |
| 15 | 23.1 | 0.0 | 0.0 | 34.6 | 34.6 | 7.7 | 0.0 | 10.0 | DMF | 10 | 159 | EC |
| 16 | 21.4 | 0.0 | 0.0 | 35.7 | 28.6 | 14.3 | 0.0 | 10.0 | DMF | 10 | 155 | EC |
| 17 | 0.0 | 26.7 | 0.0 | 33.3 | 26.7 | 13.3 | 0.0 | 10.0 | DMF | 10 | 169 | EC |
| 18 | 0.0 | 42.1 | 0.0 | 26.3 | 21.1 | 10.5 | 0.0 | 10.0 | DMF | 10 | 250 | EC |
| 19 | 21.1 | 10.5 | 10.5 | 26.3 | 21.1 | 10.5 | 0.0 | 10.0 | DMF | 10 | 216 | EC |
| 20 | 46.7 | 0.0 | 0.0 | 24.5 | 24.5 | 4.4 | 0.0 | 10.0 | DMF + NMP | 7 + 42 | 850 | — |
| 21 | 43.8 | 0.0 | 0.0 | 23.0 | 23.0 | 5.0 | 0.0 | 10.0 | FA[6)] | 10 | 327 | EC |
| 22 | 43.8 | 0.0 | 0.0 | 23.0 | 23.0 | 5.0 | 0.0 | 10.0 | 2P[7)] | 10 | 175 | EC |
| 23 | 43.8 | 0.0 | 0.0 | 23.0 | 23.0 | 5.0 | 0.0 | 10.0 | DEF[8)] | 10 | 147 | EC |
| 24 | 43.8 | 0.0 | 0.0 | 23.0 | 23.0 | 5.0 | 0.0 | 10.0 | NMF[9)] | 10 | 252 | EC |
| 25 | 43.8 | 0.0 | 0.0 | 23.0 | 23.0 | 5.0 | 0.0 | 10.0 | ε-caprolactam | 10 | 131 | EC |
| 26 | 43.8 | 0.0 | 0.0 | 23.0 | 23.0 | 5.0 | 0.0 | 10.0 | acetamide | 10 | 252 | EC |
| 27 | 43.8 | 0.0 | 0.0 | 23.0 | 23.0 | 5.0 | 0.0 | 10.0 | NMAc[10)] | 10 | 203 | EC |

[1)]N,N-diemthylformamide, [2)]N,N-dimethylacetamide, [3)]N-methylpyrrolidone, [4)]ethyl cellosolve, [5)]ethyl alcohol, [6)]formamide, [7)]2-pyrrolidone, [8)]N,N-diethylformamide, [9)]N-methylformamide, and [10)]N-methylacetamide.
*quantity is based on weight % of an organic compound with respect to the entirety of coating solution
**proportion is based on an organic compound serving as a color coupler auxiliary agent (total mol)/coloring component (total mol) × 100 (%).

Working Examples

Source solutions of respective elements prepared as described above were weighed so as to attain the compositional proportions shown in Table 2. Subsequently, the resultant mixture was diluted with ethyl cellosolve or ethyl alcohol serving as a solvent, so as to attain the indicated solid content, followed by mixing to thereby obtain a coating solution.

The coating solution prepared in the above-mentioned manner was applied to a green glass substrate by spin-coating. The rotation speed of spin-coating was 1500 rpm for Examples 1–4 and Examples 14–27, 1600 rpm for Examples 5–7, and 1700 rpm for Examples 9–11. only in Example 8, the film was formed through a flexo-coating method.

The substrate on which film had been formed was air-dried at room temperature, and treated with heat (maximum temperature: 300° C.) in a far-infrared furnace to thereby complete firing. Next, the substrate was treated with heat (maximum temperature: 660° C.) in order to enhance film strength, which resulted in the formation of a glass substrate having a color film.

Table 3 shows optical characteristics of the resultant glass plate having a color film thereon. The optical characteristics include transmittance of visible light (from light source "A") Ya, chromaticity of the transmitted light (the Lab color system), reflectance of visible light (from light source "A") Rg and chromaticity of the reflected light (the Lab color system) as measured on the glass surface; and reflectance of visible light (from light source "A") Rf and chromaticity of the reflected light (the Lab color system) as measured on the film surface.

EXAMPLES 1–11

In Examples 1 through 11, the composition of a Si—Cu—Mn—Ni color film was varied.

As a result, it was found that color films having a color ranging from blue to black can be obtained.

In all Examples, DMF was used as an organic compound. The DMF content was 15 wt. % in Examples 1 through 7 and 10 wt. % in Examples 8 through 10, based on the entirety of the coating solution. Further, in all cases DMF content falls within the scope of 103%–360% with respect to the content of a transition metal serving as the coloring component.

In all Examples, the obtained color film showed excellent coloring.

EXAMPLE 12

In this Example, as a coloring component, Co was added to a Si—Cu—Mn—Ni color film. In this case value "a" was found to shift to one direction effected by addition of Co. DMF was employed as an organic compound. The DMF content was 5 wt. % based on the entirety of the coating solution, or 227% with respect to the content of the transition metal component serving as the coloring component. The color film obtained in this Example also showed excellent coloring.

EXAMPLE 13

In this Example, DMAC was used instead of DMF. The DMAC content was 10 wt. %, or 150% in terms of the aforementioned ratio. The color film obtained in this Example also showed excellent coloring.

EXAMPLE 14

In this Example, NMP was used instead of DMF. The NMP content was 10 wt. %, or 132% in terms of the aforementioned ratio. The color film obtained in this Example also showed excellent coloring.

EXAMPLES 15–16

In these Examples, the lower limit of the compositional ratio of Si serving as a network former was determined. As is apparent from the results, when Si serving as a network former is contained in an amount of about 20%, a color film having excellent durability can be obtained.

EXAMPLES 17–18

In these Examples, as a network former, B was used instead of Si. Compositional proportions of B were 26.7% and 42.1%, respectively. The color film containing B as a network former also showed excellent durability.

EXAMPLE 19

In this Example, as network formers, Si—B—Al were used instead of Si. Compositional proportions of Si, B, and Al were 21.1%, 10.5%, and 10.5%, respectively. The color film containing Si—B—Al as network formers also showed excellent durability.

EXAMPLE 20

In this Example, DMF and NMP were added as organic compounds. The DMF content was 7 wt. %, or 157% in terms of the aforementioned ratio. The NMP content was 42 wt. %, or 693% in terms of the aforementioned ratio. The ratio of total organic compounds was 850%. In this Example, no specific solvent was specially added. NMP dissolves alkoxides and transition metals well and imparts good wettability to a substrate. Further, a large amount of NMP; i.e. 42% by weight with respect to the entirety of the coating solution, was added. Therefore, no addition of solvent is required. The color film obtained in this Example also showed excellent coloring.

EXAMPLE 21

In this Example, formamide was used instead of DMF. The formamide content was 10 wt. %, or 327% in terms of the aforementioned ratio. The color film obtained in this Example also showed excellent coloring.

EXAMPLE 22

In this Example, 2-pyrrolidone was used instead of DMF. The 2-pyrrolidone content was 10 wt. %, or 175% in terms of the aforementioned ratio. The color film obtained in this Example also showed excellent coloring.

EXAMPLE 23

In this Example, N,N-diethylformamide was used instead of DMF. The N,N-diethylformamide content was 10 wt. %, or 147% in terms of the aforementioned ratio. The color film obtained in this Example also showed excellent coloring.

EXAMPLE 24

In this Example, N-methylformamide was used instead of DMF. The N-methylformamide content was 10 wt. %, or 252% in terms of the aforementioned ratio. The color film obtained in this Example also showed excellent coloring.

EXAMPLE 25

In this Example, $\epsilon$-caprolactam was used instead of DMF. The $\epsilon$-caprolactam content was 10 wt. %, or 131% in terms of the aforementioned ratio. The color film obtained in this Example also showed excellent coloring.

EXAMPLE 26

In this Example, acetamide was used instead of DMF. The acetamide content was 10 wt. %, or 252% in terms of the aforementioned ratio. The color film obtained in this Example also showed excellent coloring.

EXAMPLE 27

In this Example, N-methylacetamide was used instead of DMF. The N-methylacetamide content was 10 wt. %, or 203% in terms of the aforementioned ratio. The color film obtained in this Example also showed excellent coloring.

The color films obtained from Examples 1 through 27 showed excellent properties in chemical resistance tests (acid resistance, alkali resistance), and were found to exhibit excellent resistance to boiling water and remarkable wear and abrasion resistance.

TABLE 3

| Ex. No. | Light-transmitting characteristics | | | Reflection on glass surface | | | Reflection on film surface | | |
|---|---|---|---|---|---|---|---|---|---|
| | Ya | a | b | Rg | a | b | Rf | a | b |
| 1 | 30.4 | −1.4 | 2.4 | 4.6 | 1.1 | −5.9 | 4.8 | −2.8 | −3.5 |
| 2 | 18.9 | −1.0 | −7.0 | 5.5 | −0.9 | −3.4 | 5.8 | −1.5 | 1.5 |
| 3 | 22.5 | −1.3 | −0.6 | 6.1 | −2.8 | −1.9 | 7.5 | −2.8 | 4.2 |
| 4 | 19.3 | −1.1 | −7.3 | 5.5 | −1.0 | −3.4 | 5.9 | −1.5 | 0.7 |
| 5 | 27.7 | −1.3 | 0.8 | 5.7 | −2.7 | −2.6 | 7.0 | −3.2 | −0.6 |
| 6 | 30.4 | −1.5 | −0.2 | 5.0 | −0.5 | −5.7 | 5.6 | −3.1 | −1.8 |
| 7 | 40.5 | −1.8 | 2.3 | 4.9 | 0.2 | −5.8 | 5.5 | −3.5 | −3.3 |
| 8 | 24.5 | −1.3 | −0.4 | 5.8 | −1.2 | −4.8 | 7.8 | −3.1 | −0.2 |
| 9 | 28.2 | −1.3 | −4.1 | 5.2 | −1.2 | −4.5 | 6.3 | −3.0 | 0.8 |
| 10 | 39.5 | −1.8 | 0.0 | 5.2 | −0.9 | −4.5 | 6.0 | −3.6 | −0.6 |
| 11 | 29.1 | −1.2 | 2.1 | 5.2 | −1.3 | −5.0 | 6.7 | −3.3 | −0.2 |
| 12 | 26.4 | −2.1 | 0.0 | 5.7 | −1.7 | −4.8 | 7.4 | −3.1 | 0.2 |

TABLE 3-continued

| Ex. No. | Light-transmitting characteristics | | | Reflection on glass surface | | | Reflection on film surface | | |
|---|---|---|---|---|---|---|---|---|---|
| | Ya | a | b | Rg | a | b | Rf | a | b |
| 13 | 24.2 | −1.2 | −5.3 | 5.6 | −0.8 | −5.2 | 6.1 | −2.9 | −0.6 |
| 14 | 28.1 | −1.1 | −3.9 | 5.4 | −0.6 | −6.0 | 7.7 | −4.5 | 1.7 |
| 15 | 5.7 | −0.3 | −11.6 | 6.3 | 0.3 | 0.1 | 9.9 | 2.1 | 3.1 |
| 16 | 10.9 | −1.1 | −1.5 | 5.8 | −0.8 | −1.5 | 11.0 | −0.8 | 2.8 |
| 17 | 20.5 | −1.4 | −0.5 | 5.8 | 1.5 | −2.2 | 6.9 | 3.2 | 2.5 |
| 18 | 31.2 | −1.3 | −0.2 | 5.2 | 1.1 | −3.2 | 5.6 | −3.8 | 1.7 |
| 19 | 29.2 | −1.3 | −0.3 | 5.1 | −1.1 | −4.3 | 6.9 | −3.1 | −0.1 |
| 20 | 53.0 | −3.4 | −2.3 | 9.1 | −1.2 | 5.5 | 4.9 | 2.9 | 0.8 |
| 21 | 23.1 | −1.2 | −4.8 | 5.7 | −0.9 | −5.1 | 6.8 | −3.1 | −0.2 |
| 22 | 30.2 | −1.8 | −2.1 | 5.4 | −1.1 | −5.6 | 8.2 | −2.8 | −1.1 |
| 23 | 26.1 | −0.9 | −3.1 | 5.1 | −0.2 | −4.3 | 5.2 | −1.8 | −0.1 |
| 24 | 22.1 | −1.9 | −5.1 | 5.5 | 0.1 | −4.0 | 7.1 | −3.4 | −0.8 |
| 25 | 27.1 | −0.9 | −5.8 | 5.2 | −1.1 | −5.8 | 6.8 | −2.8 | 1.0 |
| 26 | 30.1 | −1.1 | −3.2 | 5.8 | −0.9 | −3.9 | 6.3 | −3.1 | −0.5 |
| 27 | 35.1 | −1.3 | −2.8 | 6.0 | −0.7 | −4.2 | 6.0 | −2.2 | −1.0 |

Comparative Examples

Hereinafter, Comparative Examples will be described.

Source liquids of respective elements prepared as described above were separately weighed so as to attain the compositional proportions shown in Table 4. Subsequently, the resultant mixture was diluted with ethyl cellosolve serving as a solvent so as to attain the indicated overall solid content, and the resultant mixture was mixed to thereby obtain a coating solution.

The coating solution prepared in the above-mentioned manner was applied to the green glass substrate by spin-coating. The rotation speed for spin-coating was 1500 rpm for Comparative Examples 1 and 8, and 3000 rpm for Comparative Examples 3–6. Only in Comparative Examples 2 and 7, the film was formed through a flexo-coating method.

The substrate on which a film had been formed was air-dried at room temperature, and treated with heat (maximum temperature: 300° C.) in a far-infrared furnace to thereby complete firing. Next, the substrate was treated with heat (maximum temperature: 660° C.) in order to enhance the film strength, resulting in the formation of a glass substrate having a color film.

Optical characteristics of a glass plate having the color film thereon were measured through the same methods employed in Examples. The results are shown in Table 5.

Moreover, chemical resistance tests, the plating solution resistance test, and the Tabar's test were carried out in a similar manner as described in Examples. The standards for evaluation are also the same as described previously. The results are shown in Table 6.

In Comparative Examples 1–7, 9, and 10, the essential element Ni of the present invention was not included.

Comparative Example 1

In Comparative Example 1, the same organic compound as used in the present invention was included. The weight ratio of the organic compound to a coloring component was 259%.

The point of difference between Comparative Example 1 and the Examples is that the color film of Comparative Example 1 contained no Ni. Therefore, acid resistance and durability in a metal plating solution of the color film were poor, resulting in decoloring and increase in transmittance.

In the acid resistance test, transmittance increased by 5%, and in the plating solution resistance test, transmittance increased by 6%.

Comparative Example 2

In Comparative Example 2, 2EG (diethylene glycol) was used as the organic compound and Co was contained instead of Ni.

In this case, acid resistance and durability in the metal plating solution of the color film were poor, possibly due to absence of Ni, resulting in decoloring and increase in transmittance. In the acid resistance test, transmittance increased by 4%, and in the plating solution resistance test, transmittance increased by 6%.

Comparative Examples 3–6

In Comparative Examples 3–6, PEG300 (ethylene glycol oligomer, average molecular weight 300) was used as the organic compound and Co was contained instead of Ni.

In this case, acid resistance and durability in the plating solution of the color film were poor, resulting in decoloring and an increase in transmittance.

Comparative Example 7

In Comparative Example 7, the same organic compound as used in the present invention was used. The weight ratio of the organic compound to a coloring component was 259%.

In this case, no Ni was contained. Therefore, acid resistance and durability in the plating solution of the color film were poor, resulting in decoloring and an increase in transmittance. In both the acid resistance test and the plating solution resistance test, transmittance increased by Comparative Example 8

In Comparative Example 8, no organic compound was included. As a result, coloring attributed to a transition metal oxide was not attained and the absorption of visible light was poor.

Comparative Example 9

In Comparative Examples 9 and 10, the technique described in the above-mentioned Japanese Patent Application Laid-Open (kokai) No. 9-169546 was reexamined.

In Comparative Example 9, Ce serving as a coloring component was added in addition to Cu and Mn. The addition of Ce, which is a lanthanoid, nullified absorption attributed to transition metal oxides in spite of the presence of Cu and Mn.

Comparative Example 10

In Comparative Example 10, Cr was added as a coloring component. In this case, acid resistance and durability in metal plating liquid of the color film were significantly deteriorated. In the acid resistance test, transmittance increased by 25%, and in the plating solution resistance test, transmittance increased by 24%.

In all Comparative Examples, durability of the color film and coloring were poor, because the Comparative Examples did not meet the requirements of the present invention.

TABLE 4

| Compar. Ex. No. | Network-forming element | | | Coloring component | | | | Solid content (wt %) | Organic compound | | | Solvent |
|---|---|---|---|---|---|---|---|---|---|---|---|---|
| | Si | B | Al | Cu | Mn | Ni | Co | | Species | Quantity* | Proportion** | |
| 1 | 43.8 | 28.1 | 28.1 | 0.0 | 0.0 | 0.0 | 0.0 | 10.0 | DMF[1] | 15 | 259 | EC[4] |
| 2 | 43.8 | 25.5 | 20.4 | 0.0 | 10.2 | 0.0 | 0.0 | 10.5 | 2EG[2] | 15 | | EC |
| 3 | 43.8 | 26.0 | 20.8 | 0.0 | 9.4 | 0.0 | 0.0 | 7.7 | PEG300[3] | 20 | | EC |
| 4 | 43.8 | 26.8 | 21.4 | 0.0 | 8.0 | 0.0 | 0.0 | 7.7 | PEG300 | 20 | | EC |
| 5 | 44.1 | 27.4 | 21.9 | 0.0 | 6.6 | 0.0 | 0.0 | 7.7 | PEG300 | 20 | | EC |
| 6 | 43.8 | 28.1 | 22.5 | 0.0 | 5.6 | 0.0 | 0.0 | 7.7 | PEG300 | 20 | | EC |
| 7 | 43.8 | 25.5 | 20.4 | 0.0 | 10.2 | 0.0 | 0.0 | 10.5 | DMF | 28 | 457 | EC |
| 8 | 43.8 | 25.5 | 20.4 | 10.2 | 0.0 | 0.0 | 0.0 | 10.0 | — | — | | EC |
| 9 | 48.8 | 28.4 | 22.8 | 0.0 | 0.0 | 11.4 | 0.0 | 7.0 | PEG300 | 15 | | EC |
| 10 | 48.8 | 28.4 | 22.8 | 0.0 | 0.0 | 0.0 | 11.4 | 10.0 | PEG300 | 15 | | EC |

[1] N,N-dimethylformamide
[2] diethylene glycol
[3] polyethylene glycol (molecular weight = 300)
[4] ethyl cellosolve
*quantity is based on weight % of the organic compound with respect to the entirety of the coating solution
**proportion refers to a ratio of an organic compound serving as a color coupler auxiliary agent (total mol) to a coloring component (total mol) × 100 (%).

TABLE 5

| Compar. Ex. No. | Light-transmitting characteristics | | | Reflection on glass surface | | | Reflection on film surface | | |
|---|---|---|---|---|---|---|---|---|---|
| | Ya | a | b | Rg | a | b | Rf | a | b |
| 1 | 23.0 | −1.8 | −8.4 | 5.2 | 2.2 | −0.8 | 3.9 | 2.9 | −7.1 |
| 2 | 35.7 | −2.6 | 4.3 | 6.2 | −2.3 | 0.8 | 11.1 | −2.6 | 3.8 |
| 3 | 29.2 | −1.8 | −1.6 | 8.5 | −1.2 | 0.4 | 5.1 | −0.3 | −3.4 |
| 4 | 27.4 | −1.6 | −3.0 | 8.4 | −0.8 | −0.1 | 5.0 | 0.1 | −4.0 |
| 5 | 27.0 | −1.4 | −3.1 | 9.0 | −0.4 | −1.3 | 4.9 | 0.4 | −4.6 |
| 6 | 27.9 | −1.6 | −3.8 | 8.6 | −0.1 | −1.0 | 4.8 | 0.8 | −4.1 |
| 7 | 29.9 | −1.9 | −0.8 | 8.2 | 0.2 | −4.2 | 4.9 | 1.1 | −4.6 |
| 8 | 69.1 | −4.5 | 9.8 | 7.8 | 3.1 | −5.0 | 8.1 | 2.5 | −9.8 |
| 9 | 71.5 | −5.5 | 10.0 | 7.0 | 2.0 | −6.9 | 7.6 | 3.5 | −11.9 |
| 10 | 21.0 | −2.4 | −1.0 | 6.1 | −2.2 | −0.8 | 5.5 | −0.5 | −0.3 |

TABLE 6

| Comp. Ex No. | Acid resistance | Resistance to metal plating liquid |
|---|---|---|
| 1 | Decoloration 5% | Decoloration 6% |
| 2 | Decoloration 4% | Decoloration 6% |
| 3 | Decoloration 14% | Decoloration 6% |
| 4 | Decoloration 6% | Decoloration 6% |
| 5 | Decoloration 9% | Decoloration 6% |
| 6 | Decoloration 12% | Decoloration 6% |
| 7 | Decoloration 2% | Decoloration 2% |
| 8 | No absorption | No absorption |
| 9 | No absorption | No absorption |
| 10 | Decoloration 25% | Decoloration 24% |

Application Examples

The color film of the present invention was applied to a rear window for vehicles.

The peripheral region of the glass plate having the above-mentioned color film was treated by masking and printing, and then fired. Further, copper and nickel were plated for treatment of an antenna pattern plating. The resultant color film showed no change in optical characteristics or color tone, and a rear window for vehicles having excellent appearance was obtained.

As mentioned above, according to the method for producing light-transmitting color film of the present invention and a solution for forming the color film of the present invention, at least one organic compound having a functional group which can coordinate Ni and transition metals as coloring components is used.

As a result, a light-transmitting color film can be obtained, the film comprising a complex oxide which has excellent light-absorption efficiency in a wide color range covering dark blue, gray, and brown and chemical resistance to various chemicals (particularly acid resistance).

What is claimed is:

1. A light-transmitting color film formed on a substrate which film comprises an oxide of a network-forming element of glass and a complex oxide of at least Cu, Mn, and Ni transition metal elements serving as coloring components;

wherein the network-forming element comprises at least one element selected from the group consisting of Si, Al, and B, the total amount by mole of the network-forming element is 20–70 mol % with respect to the entirety of the elements, other than oxygen, which constitute the color film;

and the amounts by mole of the transition metal elements present in said complex oxide are as described below with respect to the entirety of the elements, other than oxygen, which constitute the color film:

Cu: 10–50 mol %,
Mn: 10–50 mol %,
Ni: 1–20 mol %, and
Co: 0–20 mol %.

2. A light-transmitting color film according to claim 1, wherein Ni is contained in an amount of 4–20 mol %.

3. A light-transmitting color film according to claim 1, which has the following optical characteristics:

luminous transmittance Ya=5–50% and
transmitted chromaticity $-2.5 \leq a \leq 0$, and
$-12 \leq b \leq 5$, as measured when the color film is formed on a 3.4 mm-thick green glass to have a thickness of 100–250 nm; provided that the green glass has the following optical characteristics: luminous transmittance of light from light source "A" (Ya)=81.0%; visible light reflectance Rg=7.2; transmitted color: light green, transparent; luminosity of transmitted light from light source "C," as expressed by chromaticity of the Lab color system, L=90.0; chromaticity of transmitted light a=−4.7, b=0.3; chromaticity of reflected light: a=−1.3 and b=−0.8.

4. A light-transmitting color film according to claim 2, which has the following optical characteristics:

luminous transmittance Ya=5–50%, and
transmitted chromaticity $-2.5 \leq a \leq 0$, and
$-12 \leq b \leq 5$, as measured when the color film is formed on a 3.4 mm-thick green glass to have a thickness of 100–250 nm; provided that the green glass has the following optical characteristics: luminous transmittance of light from light source "A" (Ya)=81.0%; visible light reflectance Rg=7.2; transmitted color: light green, transparent; luminosity of transmitted light from light source "C," as expressed by chromaticity of the Lab color system, L=90.0; chromaticity of transmitted light a=−4.7, b=0.3; chromaticity of reflected light: a=−1.3 and b=−0.8.

5. A light-transmitting color film according to claim 3 or 4, which has the following optical characteristics:

luminous transmittance Ya=5–50%, and
transmitted chromaticity $-2.5 \leq a \leq 0$, and
$-8 \leq b \leq 5$.

6. A light-transmitting color film according to claim 1, wherein the substrate is made of glass.

7. A substrate having a color film thereon, wherein the film is a multi-layered film and at least one layer of the multi-layered film is a light-transmitting film as described in claim 1.

8. A substrate having a color film thereon according to claim 7, wherein all the layers of the multi-layered film are light-transmitting color film as described in claim 1.

9. A coating solution for forming a color film, which solution comprises at least one alkoxide of an element selected from among Si, Al, and B serving as network-forming elements, transition metal salts of at least the transition metal elements Cu, Mn, and Ni but not Ce or Cr, as coloring components present in a complex oxide with one or more organic compounds having a functional group which can coordinate the transition metals.

10. A coating solution for forming a color film according to claim 9, wherein the organic compound is at least one member selected from the group consisting of N,N-dimethylformamide, N,N-dimethylacetamide, N,N-diethylformamide, ε-caprolactam, N-methylformamide, N-methylpyrrolidone, N-methylacetamide, formamide, acetamide, and 2-pyrrolidone, each member having the following group

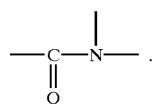

11. A coating solution for forming a color film according to claim 9, wherein the amount of each of the organic compounds contained in the coating solution is 10% or more with respect to the total mole number of the metal salts.

12. A coating solution for forming a color film according to claim 9, wherein the coating solution further contains a solvent.

13. A coating solution for forming a color film according to claim 9, wherein the transition metals further include Co.

14. A coating solution for forming a color film according to claim 9, wherein the metal salt is a nitrate salt or a chloride salt.

* * * * *

UNITED STATES PATENT AND TRADEMARK OFFICE
CERTIFICATE OF CORRECTION

PATENT NO.     : 6,399,229 B1
DATED          : June 4, 2002
INVENTOR(S)    : Hiromitsu Takeda, Kennichi Fugita, Taro Miyauchi, Toshifumi Tsujino,
                 Tatsuya Noguchi, Hideki Okamoto and Takashi Muromachi It is certified that error appears in the above-identified patent and that said Letters Patent is hereby corrected as shown below:

Column 11,
Line 2, "DMAC" should read -- DMAc --
Line 3, "DMAC" should read -- DMAc --

Column 14,
Line 56, "solution resistance test, transmittance increased by" should read -- solution resistance test, transmittance increased by 2% --

Signed and Sealed this

Twenty-fourth Day of December, 2002

JAMES E. ROGAN
*Director of the United States Patent and Trademark Office*